US012802664B2

(12) United States Patent
Nam

(10) Patent No.: US 12,802,664 B2
(45) Date of Patent: Nov. 17, 2026

(54) VOLTAGE GENERATOR AND DISPLAY DEVICE INCLUDING THE SAME

(71) Applicant: Samsung Display Co., Ltd., Yongin-Si (KR)

(72) Inventor: Yanguk Nam, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 120 days.

(21) Appl. No.: 18/953,061

(22) Filed: Nov. 20, 2024

(65) Prior Publication Data

US 2025/0252937 A1 Aug. 7, 2025

(30) Foreign Application Priority Data

Feb. 2, 2024 (KR) ........................ 10-2024-0016406

(51) Int. Cl.
*G09G 5/393* (2006.01)

(52) U.S. Cl.
CPC ....... *G09G 5/393* (2013.01); *G09G 2310/027* (2013.01); *G09G 2310/06* (2013.01); *G09G 2310/08* (2013.01); *G09G 2330/024* (2013.01)

(58) Field of Classification Search
CPC ............. G09G 5/393; G09G 2310/027; G09G 2310/06; G09G 2310/08; G09G 2330/024
See application file for complete search history.

(56) References Cited

U.S. PATENT DOCUMENTS 5,471,577 A * 11/1995 Lightbody ............... G09G 5/02 345/428
5,566,287 A * 10/1996 Delpuch .................. G09G 5/14 345/619
5,583,536 A * 12/1996 Cahill, III ............. G09G 5/395 348/592
5,768,626 A * 6/1998 Munson .................... G06F 5/06 345/558

(Continued)

FOREIGN PATENT DOCUMENTS

CN 120472799 A * 8/2025 ............. G09G 5/393
JP WO2006112229 A1 * 12/2008 ............. G09G 5/008

(Continued)

*Primary Examiner* — William Lu
(74) *Attorney, Agent, or Firm* — Innovation Counsel LLP

(57) ABSTRACT

Disclosed is a voltage generator of a display device, which includes an input circuit that outputs a first request signal and a second request signal in response to first and second voltage data signals and first and second feedback voltages, a FIFO and priority logic that outputs one of first and second selection signals as an active level in synchronization with a clock signal when at least one of the first and second request signals is at an active level, switching logic that outputs a plurality of switching signals in response to one of the first and second selection signals, which is the active level, and a voltage converter that converts an input voltage into first and second output voltages, respectively, in response to the plurality of switching signals and outputs the first and second feedback voltages corresponding to the first and second output voltages, respectively. When the first and (Continued)

second request signals are simultaneously at the active level, the FIFO and priority logic outputs one of the first and second selection signals at the active level depending on a priority.

20 Claims, 11 Drawing Sheets

(56) References Cited

U.S. PATENT DOCUMENTS

| | | | | |
|---|---|---|---|---|
| 6,119,207 | A * | 9/2000 | Chee | G09G 5/363 711/158 |
| 7,379,284 | B2 | 5/2008 | Fukushi et al. | |
| 7,417,637 | B1 * | 8/2008 | Donham | G09G 5/001 345/506 |
| 9,892,670 | B2 | 2/2018 | Seo et al. | |
| 10,523,122 | B2 | 12/2019 | Han et al. | |
| 10,572,422 | B2 * | 2/2020 | Lund | G06F 13/374 |
| 10,664,435 | B2 * | 5/2020 | Lund | G06F 13/4282 |
| 12,592,629 | B2 * | 3/2026 | Lee | H02M 1/009 |
| 2002/0145600 | A1 * | 10/2002 | Morita | G09G 3/2011 345/212 |
| 2003/0095124 | A1 * | 5/2003 | Tjandrasuwita | G09G 5/395 345/531 |
| 2004/0024983 | A1 * | 2/2004 | Satoh | G09G 5/006 711/171 |
| 2005/0071872 | A1 * | 3/2005 | Case | H04N 21/4334 386/E5.001 |
| 2010/0053129 | A1 * | 3/2010 | Morita | G09G 3/3648 345/205 |
| 2011/0063201 | A1 * | 3/2011 | Karrenbauer | G09G 3/3426 345/102 |
| 2012/0153861 | A1 * | 6/2012 | Katsis | G09G 3/025 315/291 |
| 2014/0059317 | A1 * | 2/2014 | Okajima | G06F 12/02 711/165 |
| 2015/0046678 | A1 * | 2/2015 | Moloney | G06F 12/0238 712/29 |
| 2017/0168734 | A1 * | 6/2017 | Zhang | G09G 5/02 |
| 2017/0178273 | A1 * | 6/2017 | Cheng | G09G 5/393 |
| 2018/0122305 | A1 * | 5/2018 | An | G09G 3/3258 |
| 2018/0293689 | A1 * | 10/2018 | Mcmullen | G06F 3/0416 |
| 2019/0042177 | A1 * | 2/2019 | Tanner | G06F 3/1454 |
| 2021/0191885 | A1 * | 6/2021 | Hong | G06F 13/1642 |
| 2021/0365676 | A1 * | 11/2021 | Valouch | G06V 20/62 |
| 2023/0170805 | A1 * | 6/2023 | Wei | H02M 1/0009 323/271 |
| 2023/0315600 | A1 * | 10/2023 | Hanson | G06F 1/3203 713/340 |

FOREIGN PATENT DOCUMENTS

| | | | |
|---|---|---|---|
| KR | 10-0801498 | B1 | 2/2008 |
| KR | 10-2345396 | B1 | 12/2021 |
| KR | 10-2597871 | B1 | 11/2023 |

* cited by examiner

VOLTAGE GENERATOR AND DISPLAY DEVICE INCLUDING THE SAME

CROSS-REFERENCE TO RELATED APPLICATIONS

This application claims priority under 35 U.S.C. § 119 to Korean Patent Application No. 10-2024-0016406 filed on Feb. 2, 2024, in the Korean Intellectual Property Office, the disclosures of which are incorporated by reference herein in their entireties.

BACKGROUND

Embodiments of the present disclosure relate to a voltage generator and a display device including the same.

A multimedia electronic device such as a TV, a mobile phone, a tablet computer, a navigation system, a game console, or the like generally includes a display device capable of displaying images. Such display devices require various driving voltages to display images, and the driving voltages need stable voltage levels to ensure that the display devices provide high quality images.

SUMMARY

Embodiments of the present disclosure provide a voltage generator that generates voltages with stable voltage levels and a display device including the same.

According to an embodiment of the present disclosure, a voltage generator includes an input circuit that outputs a first request signal and a second request signal in response to first and second voltage data signals and first and second feedback voltages, a FIFO and priority logic that outputs one of first and second selection signals as an active level in synchronization with a clock signal when at least one of the first and second request signals is at an active level, switching logic that outputs a plurality of switching signals in response to one of the first and second selection signals, which is the active level, and a voltage converter that converts an input voltage into first and second output voltages, respectively, in response to the plurality of switching signals and outputs the first and second feedback voltages corresponding to the first and second output voltages, respectively. The FIFO and priority logic outputs one of the first and second selection signals at the active level depending on a priority when the first and second request signals are simultaneously at the active level.

According to an embodiment, the input circuit may include a first digital-to-analog converter that converts the first voltage data signal to a first reference voltage, a first amplifier that compares the first feedback voltage with the first reference voltage and outputs the first request signal, a second digital-to-analog converter that converts the second voltage data signal to a second reference voltage, and a second amplifier that compares the second feedback voltage with the second reference voltage and outputs the second request signal.

According to an embodiment, the first amplifier may output the first request signal at the active level when a voltage level of the first feedback voltage is lower than or equal to the first reference voltage.

According to an embodiment, the FIFO and priority logic may output the first selection signal at the active level when the first and second request signals are simultaneously at the active level.

According to an embodiment, when a period of the clock signal is 'P' and the first and second request signals are simultaneously at the active levels, the FIFO and priority logic may output the first and second selection signals such that a period of the first selection signal is 2P or less.

According to an embodiment, the input circuit may further output a third request signal in response to a third data signal and a third feedback voltage, the FIFO and priority logic may output any one of the first, second, and third selection signals in synchronization with the clock signal at the active level when at least one of the first, second, and third request signals is at the active level, the switching logic may output the plurality of switching signals in response to one of the first, second, and third selection signals, which is the active level, and the voltage converter may convert the input voltage into a third output voltage in response to the plurality of switching signals and may further output a third feedback voltage corresponding to the third output voltage.

According to an embodiment, the first request signal may have a higher priority than the second request signal, and the second request signal may have a higher priority than the third request signal.

According to an embodiment, when a period of the clock signal is 'P' and the first, second, and third request signals are simultaneously at the active levels, the FIFO and priority logic may output the first, second, and third selection signals such that a period of the first selection signal is 2P or less, and a period of each of the second and third selection signals is 4P or less.

According to an embodiment, the first and second voltage data signals may be signals corresponding to target voltage levels of each of the first and second output voltages. According to an embodiment, the voltage converter may include a single inductor multiple output structure.

According to an embodiment of the present disclosure, a display device includes a display panel, a scan driving circuit that provides a scan signal to the display panel, a data driving circuit that provides a data signal to the display panel, a driving controller that outputs first and second voltage data signals and a clock signal, and a voltage generator that provides first and second driving voltages to the display panel. The voltage generator includes an input circuit that outputs a first request signal and a second request signal in response to first and second voltage data signals and first and second feedback voltages, a FIFO and priority logic that outputs one of first and second selection signals as an active level in synchronization with the clock signal when at least one of the first and second request signals is at an active level, switching logic that outputs a plurality of switching signals in response to one of the first and second selection signals, which is the active level, and a voltage converter that converts an input voltage into first and second driving voltages, respectively, in response to the plurality of switching signals and outputs the first and second feedback voltages corresponding to the first and second driving voltages, respectively. The FIFO and priority logic outputs one of the first and second selection signals at the active level depending on a priority when the first and second request signals are simultaneously at the active level.

According to an embodiment, the input circuit may include a first digital-to-analog converter that converts the first voltage data signal to a first reference voltage, a first amplifier that compares the first feedback voltage with the first reference voltage and outputs the first request signal, a second digital-to-analog converter that converts the second voltage data signal to a second reference voltage, and a second amplifier that compares the second feedback voltage with the second reference voltage and outputs the second request signal.

According to an embodiment, the first amplifier may output the first request signal at the active level when a voltage level of the first feedback voltage is lower than or equal to the first reference voltage.

According to an embodiment, the FIFO and priority logic may output the first selection signal at the active level when the first and second request signals are simultaneously at the active level.

According to an embodiment, when a period of the clock signal is 'P' and the first and second request signals are simultaneously at the active levels, the FIFO and priority logic may output the first and second selection signals such that a period of the first selection signal is 2P or less.

According to an embodiment, the input circuit may further output a third request signal in response to a third data signal and a third feedback voltage, the FIFO and priority logic may output any one of the first, second, and third selection signals in synchronization with the clock signal at the active level when at least one of the first, second, and third request signals is at the active level, the switching logic may output the plurality of switching signals in response to one of the first, second, and third selection signals, which is the active level, and the voltage converter may convert the input voltage into a third driving voltage in response to the plurality of switching signals and may further output a third feedback voltage corresponding to the third driving voltage.

According to an embodiment, the first request signal may have a higher priority than the second request signal, and the second request signal may have a higher priority than the third request signal.

According to an embodiment, when a period of the clock signal is 'P' and the first, second, and third request signals are simultaneously at the active levels, the FIFO and priority logic may output the first, second, and third selection signals such that a period of the first selection signal is 2P or less, and a period of each of the second and third selection signals is 4P or less.

According to an embodiment, the voltage converter may include a single inductor multiple output structure.

According to an embodiment, the first and second voltage data signals may be signals corresponding to target voltage levels of each of the first and second output voltages.

BRIEF DESCRIPTION OF THE DRAWINGS

The above and other objects and features of the present disclosure will become apparent by describing in detail embodiments thereof with reference to the accompanying drawings.

DETAILED DESCRIPTION

Figure 1:
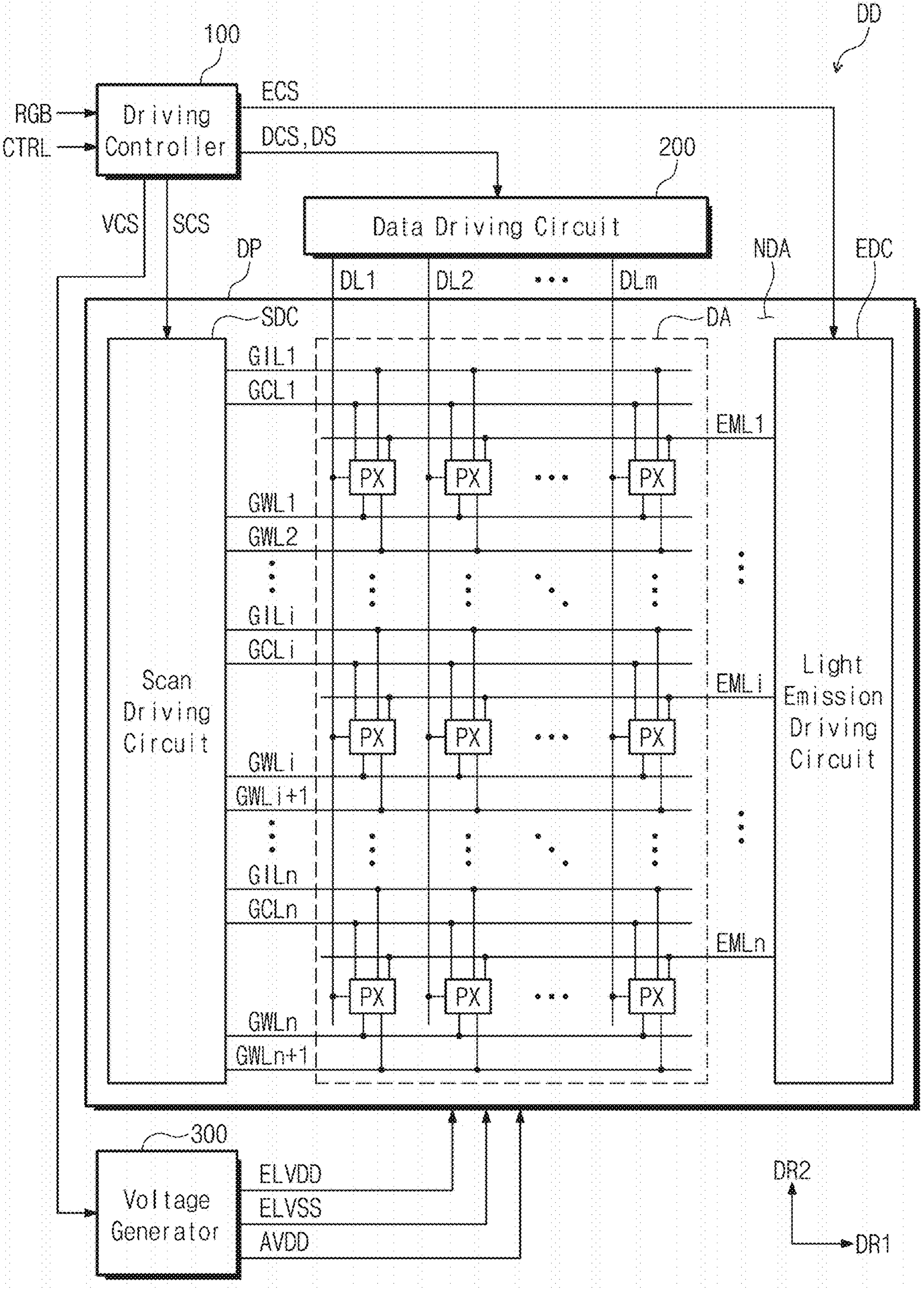
FIG. 1 is a block diagram illustrating a display device, according to an embodiment of the present disclosure.

In the specification, a component (or area, layer, part, or the like) referred to as being "on", "connected to", or "coupled to" another component indicates that the former may be directly on, connected to, or coupled to the latter, or may be on, connected to, or coupled to the latter via one or more intervening components.

The term "and/or" includes one or more combinations of the associated listed items. A singular form, unless otherwise stated, includes the plural form.

The terms "first", "second", etc. are used to describe various components, but the components are not limited by the terms. The terms are used only to differentiate one component from another component. For example, a first component may be named as a second component, and vice versa, without departing from the spirit or scope of the present disclosure.

The terms "under", "beneath", "on", and "above" are used herein to describe relationships between components. The terms are relative and may particularly be described with reference to a direction indicated in the drawings.

The terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in this specification have the same meaning as commonly understood by those skilled in the art to which the present disclosure belongs. Furthermore, terms such as terms defined in the dictionaries commonly used should be interpreted as having a meaning consistent with the meaning in the context of the related technology and should not be interpreted in ideal or overly formal sense unless explicitly defined herein.

Hereinafter, embodiments of the present disclosure will be described with reference to accompanying drawings. Like reference numerals in the description and the various drawings refer to like components. Also, in drawings, the thickness, ratio, and dimension of components may be exaggerated for effectiveness of description of technical contents.

FIG. 1 is a block diagram illustrating a display device according to an embodiment of the present disclosure.

Referring to FIG. 1, a display device DD includes a display panel DP, a driving controller 100, a data driving circuit 200, and a voltage generator 300.

The driving controller 100 receives an image signal RGB and a control signal CTRL. The driving controller 100 converts the image signal RGB into an image data signal DS. The driving controller 100 outputs an emission control signal ECS, a scan control signal SCS, a data control signal DCS, the image data signal DS, and a voltage control signal VCS.

The data driving circuit 200 receives the data control signal DCS and the image data signal DS from the driving controller 100. The data driving circuit 200 converts the image data signal DS into data signals and then outputs the data signals to a plurality of data lines DL1 to DLm to be described later.

The voltage generator 300, in response to the voltage control signal VCS from the drive controller 100, generates voltages necessary for operation of the display device DD. In the embodiment of FIG. 1, the voltage generator 300 generates a first driving voltage ELVDD, a second driving voltage ELVSS, and a third driving voltage AVDD. The first driving voltage ELVDD and the second driving voltage ELVSS may be voltages required for an operation of pixels PX in the display panel DP, and the third driving voltage AVDD may be a voltage required for operation of the data driving circuit 200.

In this specification, the voltage generator 300 is illustrated and described as an example of generating the first driving voltage ELVDD, the second driving voltage ELVSS, and the third driving voltage AVDD, but the present disclosure is not limited thereto. The type and number of driving voltages generated by the voltage generator 300 may vary.

The display panel DP includes scan lines GIL1 to GILn, GCL1 to GCLn, and GWL1 to GWLn+1, emission control lines EML1 to EMLn, data lines DL1 to DLm, and the pixels PX, where n and m are integers greater than one. The display panel DP may further include a scan driving circuit SDC and a light emission driving circuit EDC.

In the embodiment of FIG. 1, the scan driving circuit SDC on a first side of the display panel DP. The scan lines GIL1 to GILn, GCL1 to GCLn, and GWL1 to GWLn+1 extend from the scan driving circuit SDC in a first direction DR1. The scan driving circuit SDC may receive the scan control signal SCS from the driving controller 100. The scan driving circuit SDC may output scan signals to the scan lines GIL1 to GILn, GCL1 to GCLn, and GWL1 to GWLn+1 in response to the scan control signal SCS.

The light emission driving circuit EDC may be arranged at a second side of the display panel DP. The emission control lines EML1 to EMLn extend from the light emission driving circuit EDC in a direction opposite to the first direction DR1. The light emission driving circuit EDC may receive the emission control signal ECS from the driving controller 100. The light emission driving circuit EDC may output emission signals to the emission control lines EML1 to EMLn in response to the emission control signal ECS.

In an embodiment, the scan driving circuit SDC and the light emission driving circuit EDC may include transistors formed through the same process that forms the pixels PX.

The scan lines GIL1 to GILn, GCL1 to GCLn, and GWL1 to GWLn+1 and the emission control lines EML1 to EMLn are spaced from each other in a second direction DR2. The data lines DL1 to DLm extend from the data driving circuit 200 in a direction opposite to the second direction DR2 and are spaced apart from one another in the first direction DR1.

In the example illustrated in FIG. 1, the scan driving circuit SDC and the light emission driving circuit EDC face each other with the pixels PX interposed therebetween, but the present disclosure is not limited thereto. For example, the scan driving circuit SDC and the light emission driving circuit EDC may be adjacent to each other in a non-display area NDA of the display panel DP. In an embodiment, the scan driving circuit SDC and the light emission driving circuit EDC may be implemented as one circuit.

Figure 4:
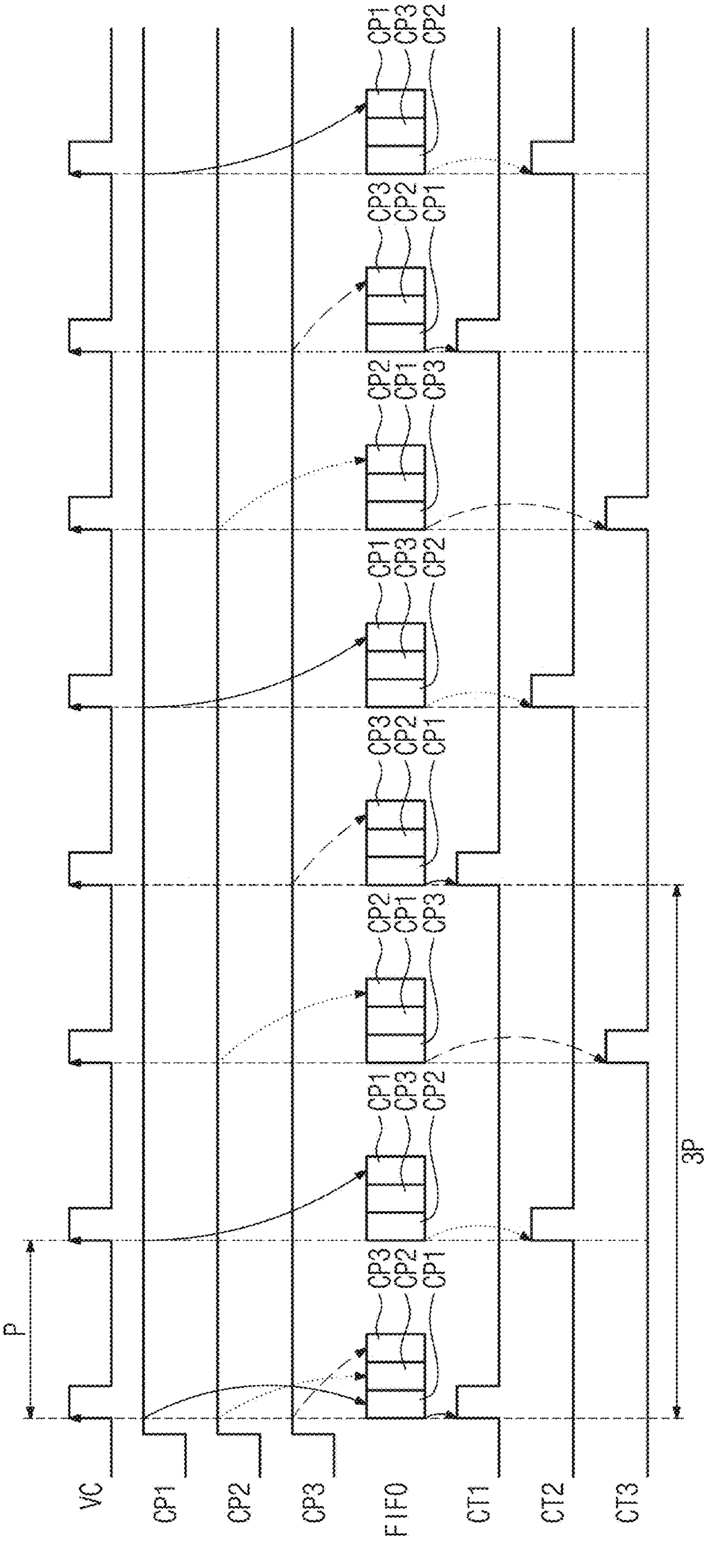
FIGS. 4 and 5 are timing diagrams for operation of a voltage generator in accordance with an embodiment of the present disclosure.

The pixels PX are electrically connected to the scan lines GIL1 to GILn, GCL1 to GCLn, and GWL1 to GWLn+1, the emission control lines EML1 to EMLn, and the data lines DL1 to DLm. Each of the pixels PX may be electrically connected to four scan lines and one emission control line. For example, as illustrated in FIG. 4, a first row of pixels may be connected to the scan lines GIL1, GCL1, GWL1, and GWL2 and the emission control line EML1. In general, the pixels PX in an i-th row may be connected to the scan lines GILi, GCLi, GWLi, and GWLi+1 and the emission control line EMLi.

Each of the pixels PX receives the first driving voltage ELVDD and the second driving voltage ELVSS, from the voltage generator 300.

Figure 2:
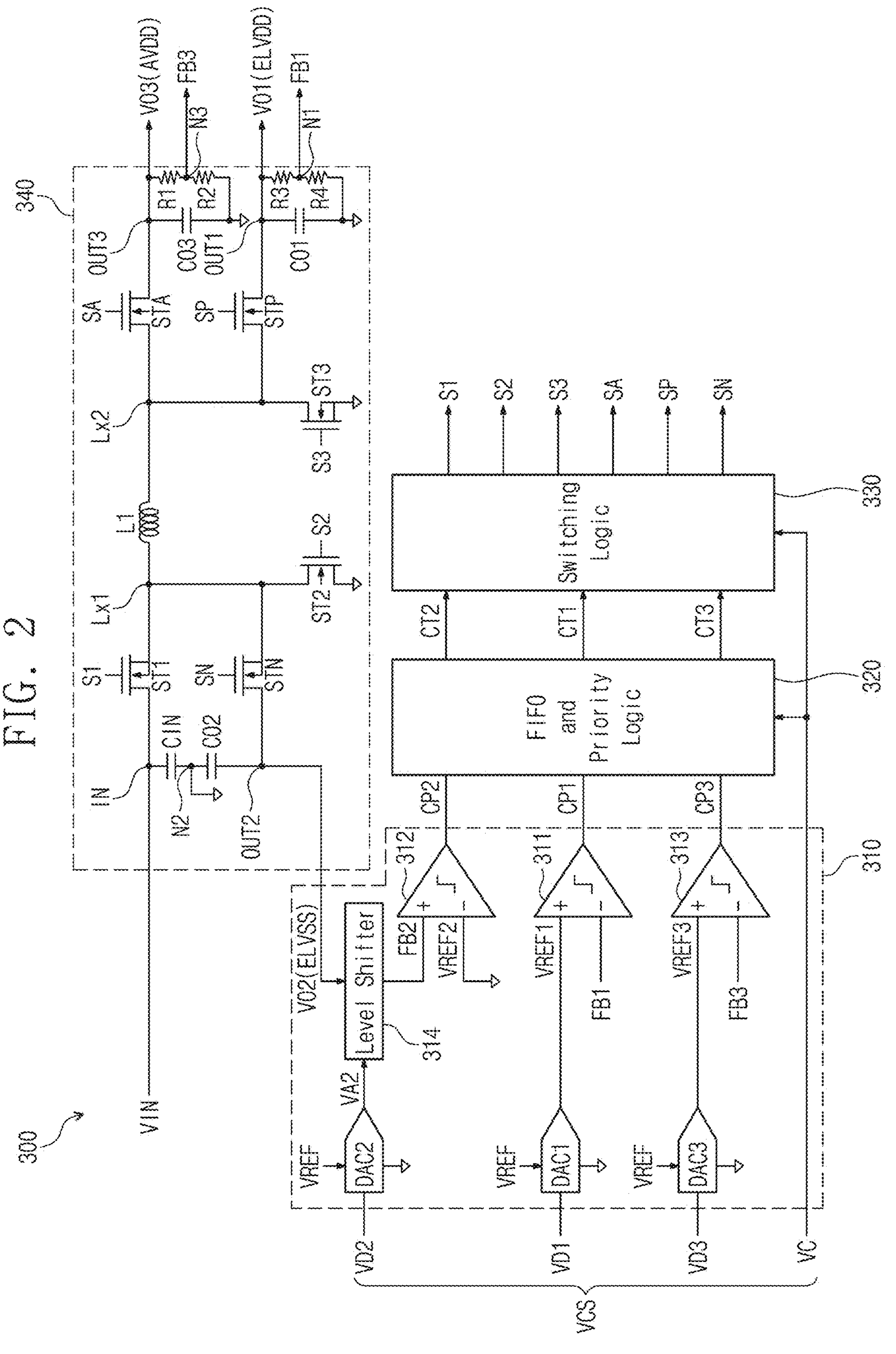
FIG. 2 is a circuit diagram illustrating a voltage generator, according to an embodiment of the present disclosure.

FIG. 2 illustrates an embodiment of the voltage generator 300.

Referring to FIG. 2, the voltage generator 300 includes an input circuit 310, first in first out (FIFO) and priority logic 320, switching logic 330, and a voltage converter 340.

The input circuit 310 includes first, second and third digital-to-analog converters DAC1, DAC2, and DAC3, first, second and third amplifiers 311, 312, and 313, and a level shifter 314. The input circuit 310 outputs first, second, and third request signals CP1, CP2, and CP3 in response to first, second, and third voltage data signals VD1, VD2, and VD3 and first, second, and third feedback voltages FB1, FB2, and FB3. In an embodiment, the voltage control signal VCS from the driving controller 100 illustrated in FIG. 1 may include the first, second, and third voltage data signals VD1, VD2, and VD3. In an embodiment, the voltage converter 340 may provide the first, second, and third feedback voltages FB1, FB2, and FB3. FIG. 2 shows an embodiment in which the level shifter generates the second feedback voltage FB2 by shifting an output voltage VO2 from the voltage converter 340.

The first, second, and third voltage data signals VD1, VD2, and VD3 may be a digital signal corresponding to target voltage levels of each of the first, second, and third output voltages VO1, VO2, and VO3 output from the voltage converter 340. The first and third digital-to-analog converters DAC1 and DAC3 respectively convert the first and third voltage data signals VD1 and VD3 into first and second reference voltages VREF1 and VREF3 which are analog signals.

The second digital-to-analog converter DAC2 converts the second voltage data signal VD2 into an analog signal VA2. The level shifter 314 outputs the second feedback voltage FB2 in response to the analog signal VA2 and the second output voltage VO2 from the voltage converter 340.

The first amplifier 311 receives the first reference voltage VREF1 and the first feedback voltage FB1 and outputs the first request signal CP1. For example, when the voltage level of the first reference voltage VREF1 is greater than the voltage level of the first feedback voltage FB1, the first amplifier 311 may output the first request signal CP1 having a high level.

The second amplifier 312 receives the second reference voltage VREF2 and the second feedback voltage FB2 and outputs the second request signal CP2. For example, when the voltage level of the second feedback voltage FB2 is greater than the voltage level of the second reference voltage VREF2, the second amplifier 312 may output the second request signal CP2 having a high level.

The third amplifier 313 receives the third reference voltage VREF3 and the third feedback voltage FB3 and outputs the third request signal CP3. For example, when the voltage level of the third reference voltage VREF3 is greater than the voltage level of the third feedback voltage FB3, the third amplifier 313 may output the third request signal CP3 having a high level.

In an embodiment, each of amplifiers 311, 312, and 313 may be an operational amplifier.

The FIFO and priority logic 320 receives the first, second, and third request signals CP1, CP2, and CP3. When there is a request signal having an active level among the first, second, and third request signals CP1, CP2, and CP3, the FIFO and priority logic 320 outputs a selection signal corresponding to the request signal having an active level in synchronization with a clock signal VC.

The FIFO and priority logic 320 determines the priorities of the first, second, and third request signals CP1, CP2, and CP3 and outputs one of the first, second, and third selection signals CT1, CT2, and CT3 at an active level in synchronization with the clock signal VC.

In an embodiment, the voltage control signal VCS from the driving controller 100 illustrated in FIG. 1 may include the clock signal VC.

The switching logic 330 outputs first to sixth switching signals S1, S2, S3, SA, SP, and SN based on which of the first, second, and third selection signals CT1, CT2, and CT3 is or are at an active level.

The voltage converter 340 receives an input voltage VIN. The voltage converter 340 converts the input voltage VIN into the first, second, and third output voltages VO1, VO2, and VO3 in response to the first to sixth switching signals S1, S2, S3, SA, SP, and SN. In an embodiment, the first, second, and third output voltages VO1, VO2, and VO3 may respectively correspond to the first, second, and third driving voltages ELVDD, ELVSS, and AVDD illustrated in FIG. 1.

The voltage converter 340 may include a single inductor multiple output (SIMO) structure that includes one inductor L1 and outputs the plurality of output voltages VO1, VO2, and VO3.

The voltage converter 340 in the embodiment shown in FIG. 2 includes the inductor L1, the first to sixth switching transistors ST1, ST2, ST3, STA, STP, and STN, capacitors CIN, CO1, CO2, and CO3, and resistors R1, R2, R3, and R4. The voltage converter 340 including the single inductor multiple output structure may minimize power consumption by using the one inductor L1 and the plurality of capacitors CIN, CO1, CO2, and CO3. The circuit configuration of the voltage converter 340 illustrated in FIG. 2 is only an example, and the present disclosure is not limited thereto.

In the embodiment of FIG. 2, the inductor L1 is connected between a node LX1 and a node LX2.

The first switching transistor ST1 is connected between an input node IN and the node LX1 and includes a gate electrode that receives the first switching signal S1. The input node IN receives the input voltage VIN.

The second switching transistor ST2 is connected between the node LX1 and a ground terminal and includes a gate electrode that receives the second switching signal S2.

The third switching transistor ST3 is connected between the node LX2 and the ground terminal and includes a gate electrode that receives the third switching signal S3.

The fourth switching transistor STA is connected between the node LX2 and a third output node OUT3 and includes a gate electrode that receives the fourth switching signal SA. The third output node OUT3 outputs the third output voltage VO3.

The fifth switching transistor STP is connected between the node LX2 and a first output node OUT1 and includes a gate electrode that receives the fifth switching signal SP. The first output node OUT1 outputs the first output voltage VO1.

The sixth switching transistor STN is connected between the node LX1 and a second output node OUT2 and includes a gate electrode that receives the sixth switching signal SN. The second output node OUT2 outputs the second output voltage VO2.

The resistors R1 and R2 are sequentially connected in series between the third output node OUT3 and the ground terminal. A third feedback node N3, which is a connection node between the resistors R1 and R2, outputs the third feedback voltage FB3. The third feedback voltage FB3 has a voltage level less than the third output voltage VO3. When the third output voltage VO3 changes, the third feedback voltage FB3 also changes.

The resistors R3 and R4 are sequentially connected in series between the first output node OUT1 and the ground terminal. A first feedback node N1, which is a connection node between the resistors R3 and R4, outputs the first feedback voltage FB1. The first feedback voltage FB1 has a voltage level less than the first output voltage VO1. When the first output voltage VO1 changes, the first feedback voltage FB1 also changes.

Figure 3A:
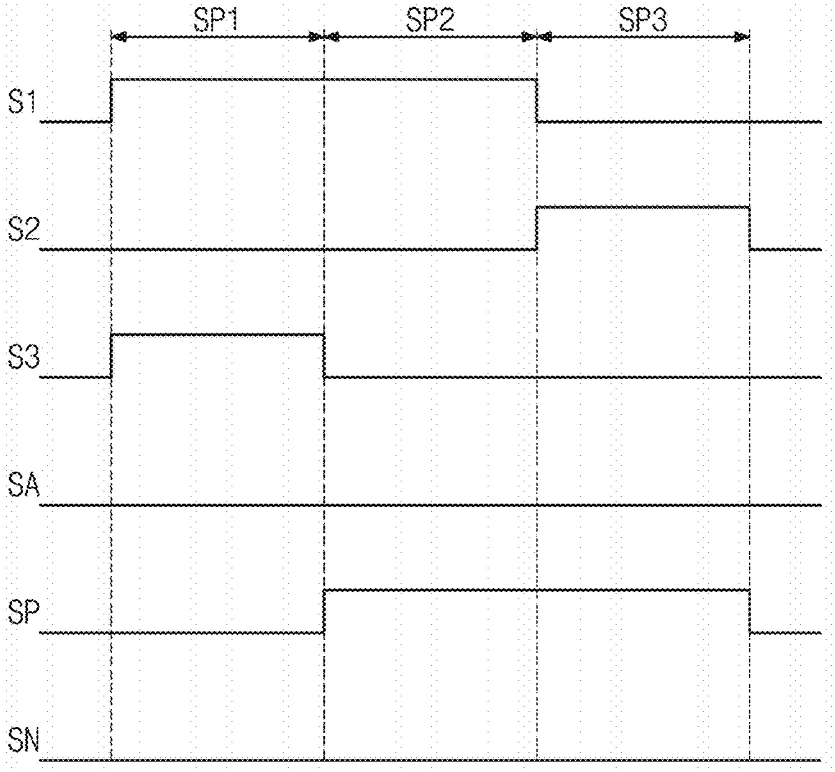
FIGS. 3A, 3B, and 3C are timing diagrams illustrating first to sixth switching signals output from switching logic.
Figure 3B:
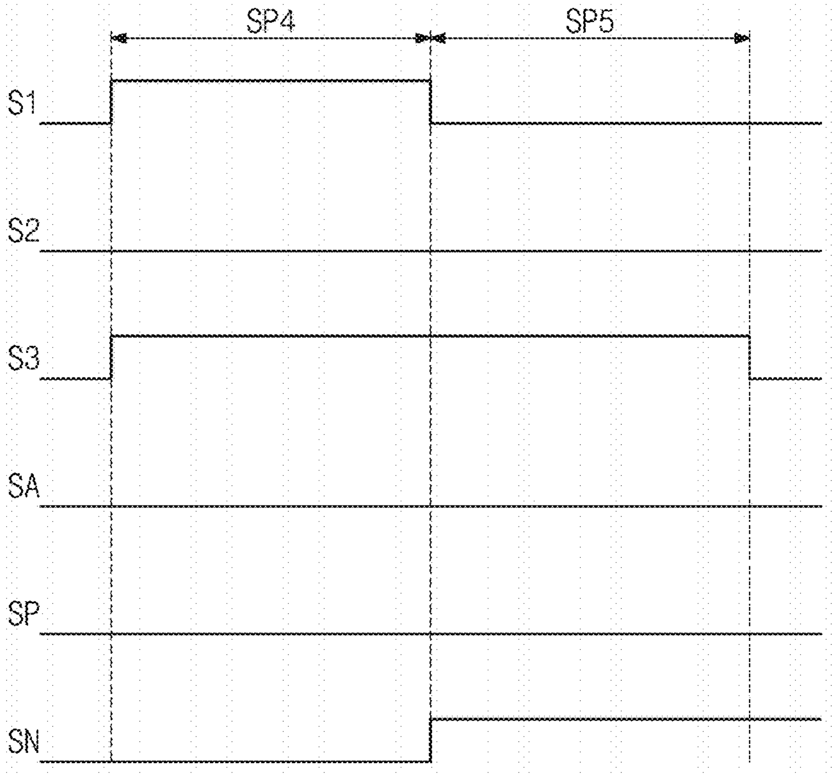
Figure 3C:
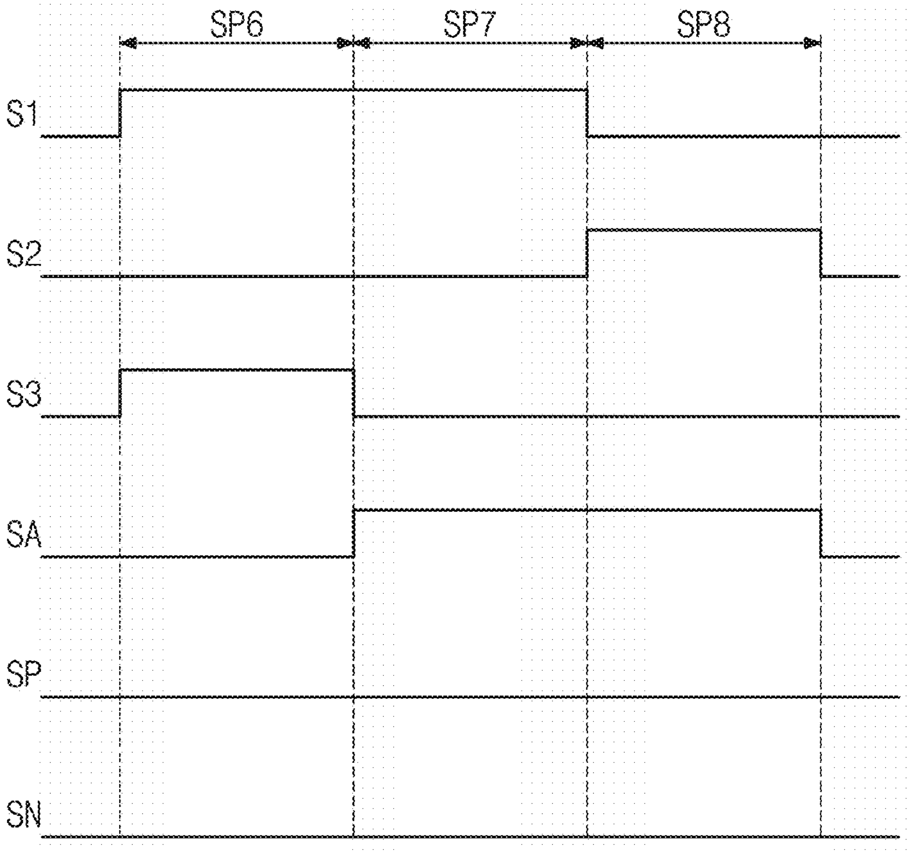

FIGS. 3A to 3C are timing diagrams illustrating the first to sixth switching signals S1, S2, S3, SA, SP, and SN output from the switching logic 330 during example operations of the voltage generator 300 of FIG. 2.

FIG. 3A is a timing diagram illustrating the first to sixth switching signals S1, S2, S3, SA, SP, and SN when the first selection signal CT1 is at an active level. The FIFO and priority logic 320 may assert the first selection signal CT1 to the active level for generation of a desired voltage level of the first output voltage V01.

Referring to FIGS. 2 and 3A, during a first switching period SP1, the first and third switching signals S1 and S3 are at high level, so the first and third switching transistors ST1 and ST3 are turned on. The other switching transistors ST2, STA, STP, and STN are off during the first switching period SP1. As a result, a current from the input voltage VIN through the first switching transistor ST1, the inductor L1, and the third switching transistor ST3 rises to a desired level.

During a second switching period SP2, the first and fifth switching signals S1 and SP are at a high level, so the first and fifth switching transistors ST1 and STP are turned on. The other switching transistors ST2, ST3, STA, and STN are off during the second switching period SP1. As a result, the current through the inductor L1 is redirected through the fifth switching transistor STP to the first output node OUT1, and the first capacitor CO1 charges.

In a third switching period SP3, the second and fifth switching signals S2 and SP are at a high level, so the second and fifth switching transistors ST2 and STP are turned on. The other switching transistors ST1, ST2, STA, and STN are off during the third switching period SP3. As a result, the first output voltage VO1 may be output to the first output node OUT1.

FIG. 3B is a timing diagram illustrating the first to sixth switching signals S1, S2, S3, SA, SP, and SN when the second selection signal CT2 is at an active level. The FIFO and priority logic 320 may assert the second selection signal CT2 to the active level for generation of a desired voltage level of the second output voltage V02.

Referring to FIGS. 2 and 3B, in a fourth switching period SP4, the first and third switching signals S1 and S3 are at high level, so the first and third switching transistors ST1 and ST3 are turned on. The other switching transistors ST2, STA, STP, and STN are off during the fourth switching period SP4. Again, a current from the input voltage VIN through the first switching transistor ST1, the inductor L1, and the third switching transistor ST3 ramps up to a desired level.

In a fifth switching period SP5, the third and sixth switching signals S3 and SP are at a high level, so the first and sixth switching transistors ST1 and STN are turned on.

The other switching transistors ST2, ST3, STA, and STP are off during the fifth switching period SP5. The sixth switching transistor STN connects the inductor L1 to the second output node OUT2, and the current that the inductor L1 maintains discharges the second capacitor C02 to a desired level. As a result, the second output voltage VO2 may be output to the second output node OUT2.

FIG. 3C is a timing diagram illustrating the first to sixth switching signals S1, S2, S3, SA, SP, and SN when the third selection signal CT3 is at an active level. The FIFO and priority logic 320 may assert the third selection signal CT3 to the active level for generation of a desired voltage level for the third output voltage V03.

Referring to FIGS. 2 and 3C, in a sixth switching period SP6, the first and third switching signals S1 and S3 are at high level, so the first and third switching transistors ST1 and ST3 are turned on. The other switching transistors ST2, STA, STP, and STN are off during the sixth switching period SP6. Again, a current from the input voltage VIN through the first switching transistor ST1, the inductor L1, and the third switching transistor ST3 ramps up to a desired level according to the load of the current path.

In a seventh switching period SP7, the first and fourth switching signals S1 and SA are at a high level, so the first and fourth switching transistors ST1 and STA are turned on. The other switching transistors ST2, ST3, STP, and STN are off during the seventh switching period SP7. As a result, the current through the inductor L1 is redirected through the fourth switching transistor STA to the third output node OUT3 and charges the third capacitor C03.

In an eighth switching period SP8, the second and fourth switching signals S2 and SA are at a high level, so the second and fourth switching transistors ST2 and STA are turned on. The other switching transistors ST1, ST3, STP, and STN are off during the eighth switching period SP8. As a result, the third output voltage VO3 may be output to the third output node OUT3.

Figure 5:
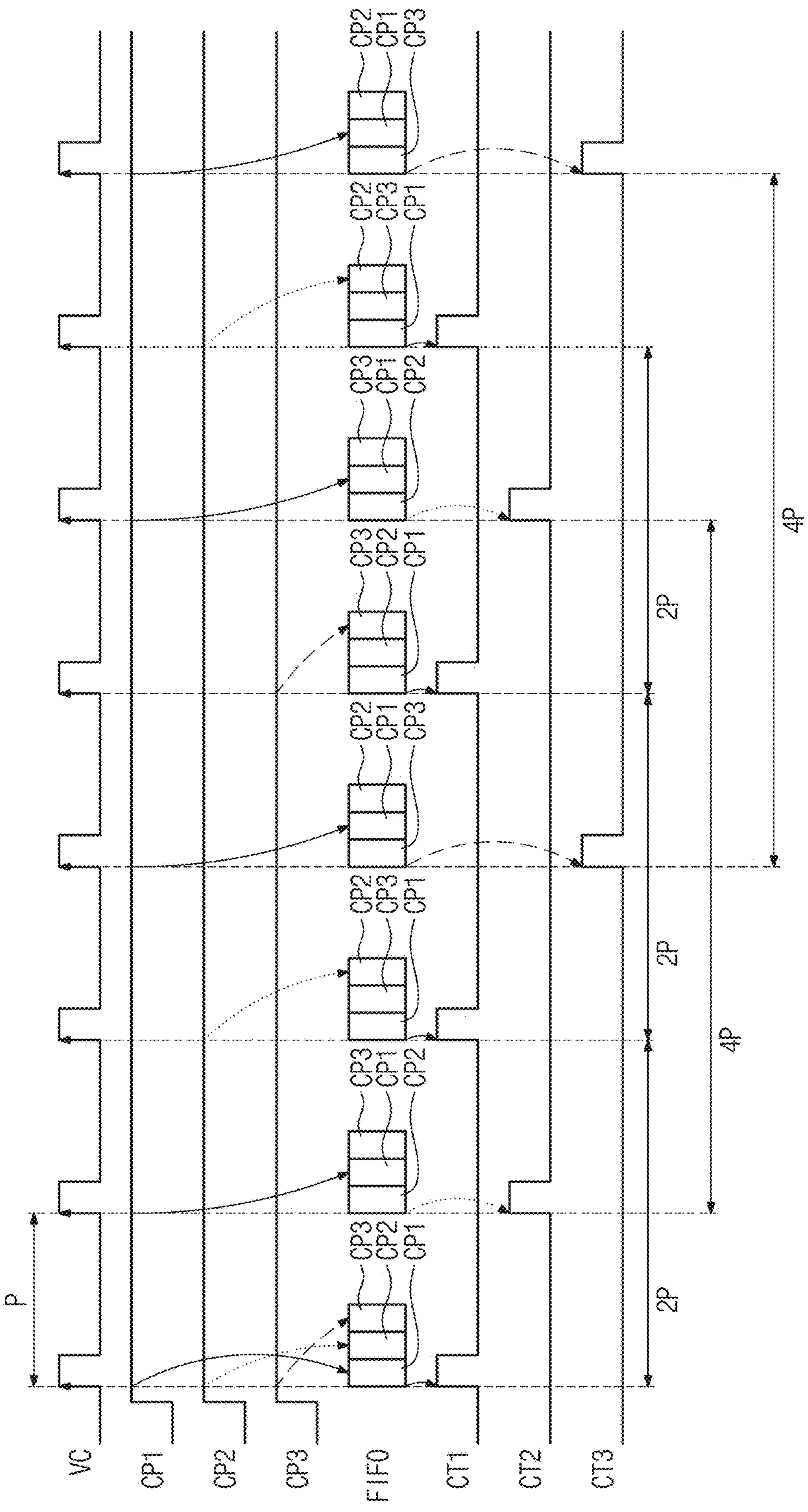

FIGS. 4 and 5 are timing diagrams illustrating an operation of the voltage generator 300.

Referring to FIGS. 2 and 4, the clock signal VC is a pulse signal that periodically transitions to a high level.

When one or more of the first, second, and third request signals CP1, CP2, and CP3 are at an active level (e.g., a high level), the FIFO and priority logic 320 determines priorities of the first, second, and third request signals CP1, CP2, and CP3. In an embodiment, the FIFO and priority logic 320 may determine the priorities in the order of the first, second, and third selection signals CT1, CT2, and CT3 when more than one of the first, second, and third selection signals CT1, CT2, and CT3 are at the active level.

The FIFO and priority logic 320 outputs any one of the first, second, and third selection signals CT1, CT2, and CT3 as an active level (e.g., a high level) in response to the clock signal VC.

In the example illustrated in FIG. 4, the first, second, and third selection signals CT1, CT2, and CT3 sequentially transition to a high level in response to successive pulses of the clock signal VC. When the period of the clock signal VC is 'P', the period of each of the first, second, and third selection signals CT1, CT2, and CT3 may be 3P.

The voltage level of the first driving voltage ELVDD (refer to FIG. 1) may ripple if the generation period of the first driving voltage is too long. Since the first driving voltage ELVDD greatly affects the display quality of the display device DD, when the first driving voltage ELVDD includes ripples, the display quality of the display device DD may deteriorate. In the example of FIG. 4, the generation period of V01 (ELVDD) is 3P.

Referring to FIGS. 2 and 5, when the first, second, and third request signals CP1, CP2, and CP3 are all at the active level, the FIFO and priority logic 320 may determine the priorities of the first, second, and third selection signals CT1, CT2, and CT3 such that the period of the first selection signal CT1 is 2P or less and the period of each of the second and third selection signals CT2 and CT3 is 4P or less. For example, the FIFO and priority logic 320 may sequentially output the first selection signal CT1, the second selection signal CT2, the first selection signal CT1, the third selection signal CT3, and the first selection signal CT1 as high levels. In the example of FIG. 5, the generation period of V01 (ELVDD) is 2P, which is a shorter generation period than provided in the example of FIG. 4.

Figure 6:
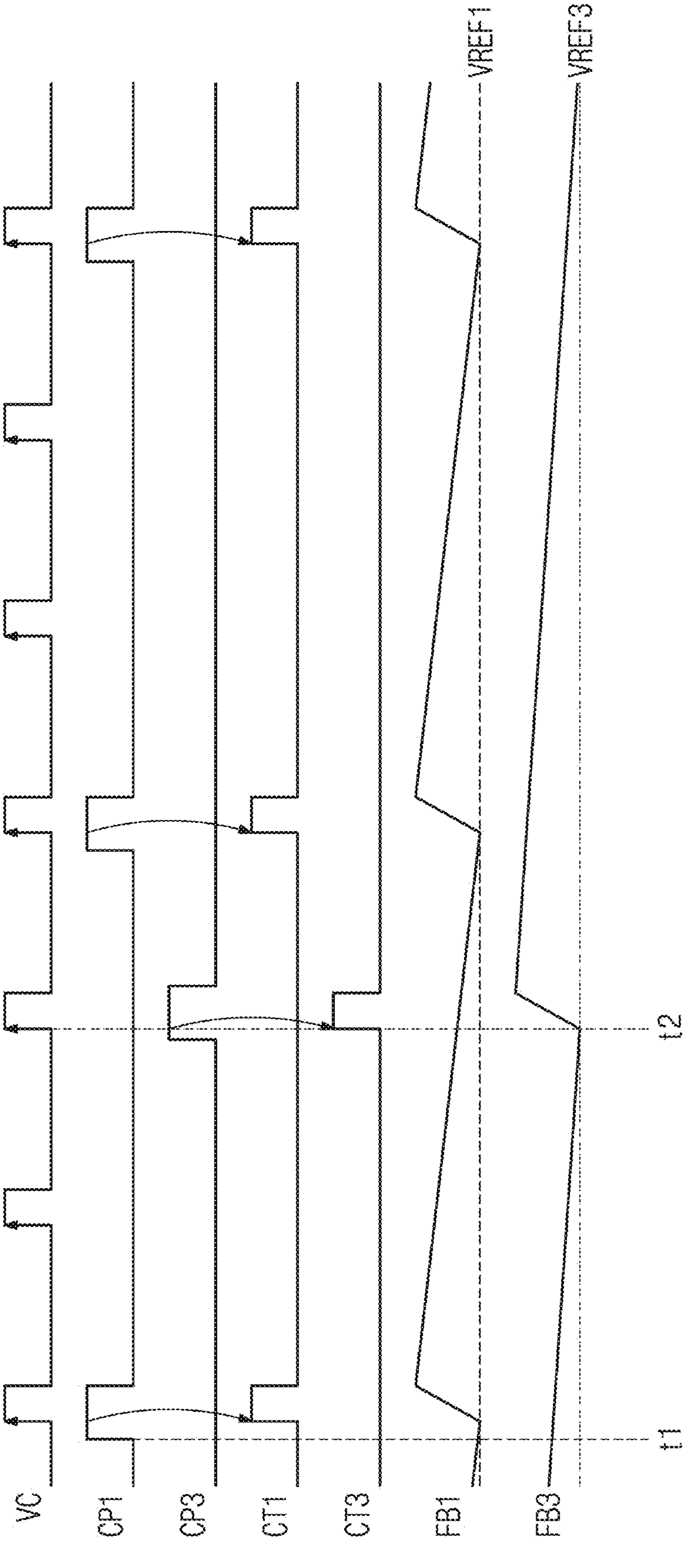
FIG. 6 is a timing diagram illustrating first and third request signals and first and third selection signals, according to voltage levels of first and third feedback voltages.

FIG. 6 is a timing diagram illustrating the first and third request signals CP1 and CP3 and the first and third selection signals CT1 and CT3, according to voltage levels of the first and third feedback voltages FB1 and FB3.

Referring to FIGS. 2 and 6, the first amplifier 311 may output the first request signal CP1 having a high level when the voltage level of the first reference voltage VREF1 is greater than the voltage level of the first feedback voltage FB1. In FIG. 6, when the voltage level of the first feedback voltage FB1 is less than or equal to the voltage level of the first reference voltage VREF1 at a first time t1, the first amplifier 311 outputs the first request signal CP1 having a high level. The FIFO and priority logic 320 outputs the first selection signal CT1 corresponding to the first request signal CP1 at a high level in synchronization with the clock signal VC.

The third amplifier 313 may output the third request signal CP3 having a high level when the voltage level of the third reference voltage VREF3 is greater than the voltage level of the third feedback voltage FB3. In FIG. 6, when the voltage level of the third feedback voltage FB3 is less than or equal to the voltage level of the third reference voltage VREF3 at a second time t2, the third amplifier 313 outputs the third request signal CP3 having a high level. The FIFO and priority logic 320 outputs the third selection signal CT3 corresponding to the third request signal CP3 at a high level in synchronization with the clock signal VC.

In FIG. 6, the first request signal CP1 transitions to a high level at the first time t1 and then the second request signal CP2 transitions to a high level at the second time t2, so the FIFO and priority logic 320 may output the first selection signal CT1 and the third selection signal CT3 at a high level in response to the first request signal CP1 and the third request signal CP3, respectively. In detail, the FIFO and priority logic 320 performs a FIFO operation that outputs the first selection signal CT1 at a high level in response to the first request signal CP1 transitioning to a high level first, and then outputs the third selection signal CT3 at a high level in response to the third request signal CP3.

As illustrated in FIG. 5, when at least two of the first, second, and third request signals CP1, CP2, and CP3 are at a high level at the same time, the FIFO and priority logic 320 may output any one of the first, second, and third selection signals CT1, CT2, and CT3 at an active level based on the priorities.

Figure 7A:
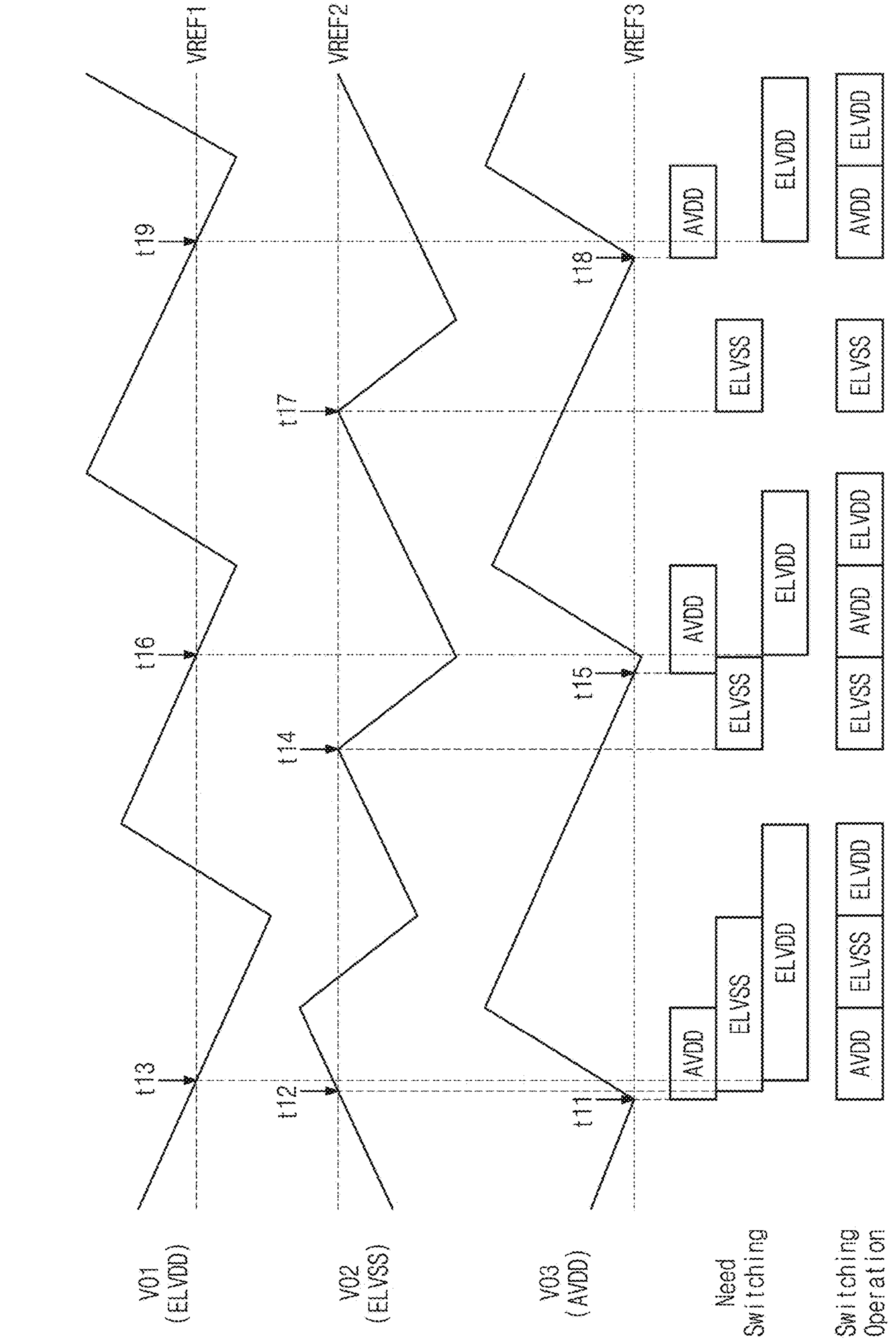
FIGS. 7A and 7B are timing diagrams illustrating operation of FIFO and priority logic and a voltage converter, according to voltage levels of the first, second, and third driving voltages, respectively.
Figure 7B:
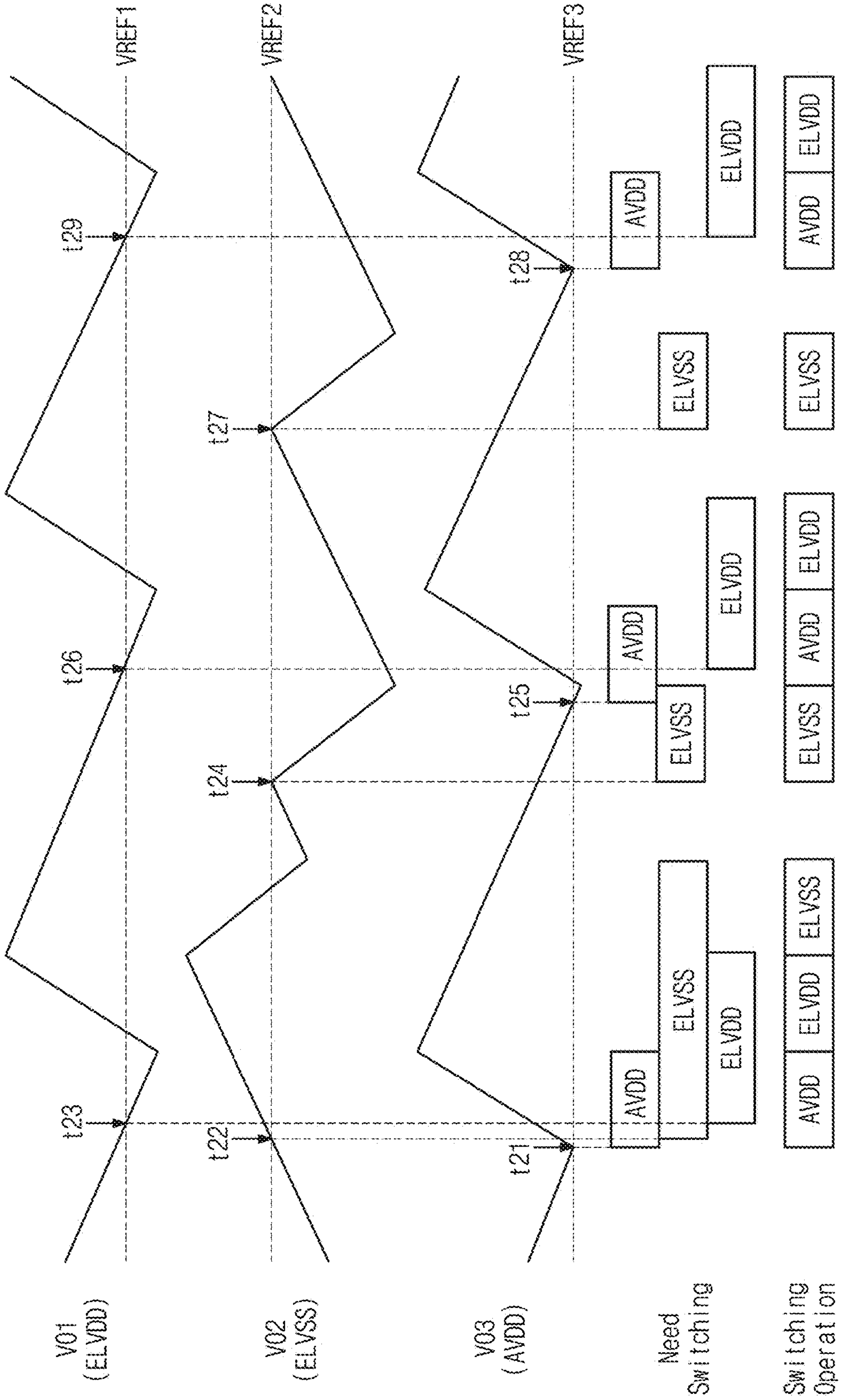

FIGS. 7A and 7B are timing diagrams illustrating operation of the FIFO and priority logic 320 and the voltage converter 340, according to voltage levels of each of the first driving voltage ELVDD, the second driving voltage ELVSS, and the third driving voltage AVDD. FIGS. 7A and 7B particularly apply to the voltage generator 300 of FIG. 2 in an example where the first feedback voltage FB1, the second feed back voltage FB2, and the third feedback voltage FB3 are respectively equal to the first drive voltage V01 (ELVDD), the second drive voltage V02 (ELVSS), and the third drive voltage V03 (AVDD), e.g., in an example where resistors R1 and R3 are omitted or have zero resistance.

Referring to FIGS. 2 and 7A, FIFO and priority logic 320 determines that the voltage converter 340 requires a switching operation to generate the first output voltage VO1, that is, the first driving voltage ELVDD, when the first amplifier 311 outputs the first request signal CP1 having a high level indicating that the voltage level of the first feedback voltage FB1 is less than or equal to the voltage level of the first reference voltage VREF1. For the example of FIG. 7A, the first amplifier 311 may output the first request signal CP1 having a high level at each of times t13, t16, and t19.

When the voltage level of the second feedback voltage FB2 is greater than the voltage level of the second reference voltage VREF2, the second amplifier 312 determines that the voltage converter 340 requires a switching operation to generate the second output voltage VO2, that is, the second driving voltage ELVSS, and outputs the second request signal CP2 having a high level. For the example of FIG. 7A, the second amplifier 312 may output the second request signal CP2 having a high level at each of times t12, t14, and t17.

When the voltage level of the third feedback voltage FB3 is less than or equal to the voltage level of the third reference voltage VREF3, the third amplifier 313 determines that the voltage converter 340 requires a switching operation to generate the third output voltage VO3, that is, the third driving voltage AVDD, and outputs the third request signal CP3 having a high level. For the example of FIG. 7A, the third amplifier 313 may output the third request signal CP3 having a high level at each of times t11, t15, and t18.

As illustrated in FIG. 7A, when the FIFO and priority logic 320 outputs the first, second, and third selection signals CT1, CT2, and CT3 in the order of occurrence of the first, second, and third request signals CP1, CP2, and CP3, a time during which the first driving voltage ELVDD is at a level less than the first reference voltage VREF1 may be long. In this case, variation in the first driving voltage may cause flicker in the image displayed on the display device DD (refer to FIG. 1).

Referring to FIGS. 2 and 7B, the first amplifier 311 may output the first request signal CP1 having a high level at each of times t23, t26, and t29. The second amplifier 312 may output the second request signal CP2 having a high level at each of the times t22, t24, and t27. The third amplifier 313 may output the third request signal CP3 having a high level at each of the times t21, t25, and t28.

The FIFO and priority logic 320 may output the first, second, and third selection signals CT1, CT2, and CT3 depending on the priority even if at least two of the first, second, and third request signals CP1, CP2, and CP3 are at the high level at the same time. For example, while the voltage converter 340 is performing a switching operation to output the third driving voltage AVDD, even if the second driving voltage ELVSS becomes greater than the second reference voltage VREF2 and then the first driving voltage ELVDD becomes less than the first reference voltage VREF1, the priority of the first driving voltage ELVDD is relatively higher. Therefore, the FIFO and priority logic 320 first activates the first request signal CP1 to a high level. Therefore, the voltage converter 340 may perform a switching operation to output the first driving voltage ELVDD when the switching operation to output the third driving voltage AVDD is completed. As a result, the time for which the first driving voltage ELVDD is at a level less than the first reference voltage VREF1 may be minimized.

Figure 8A:
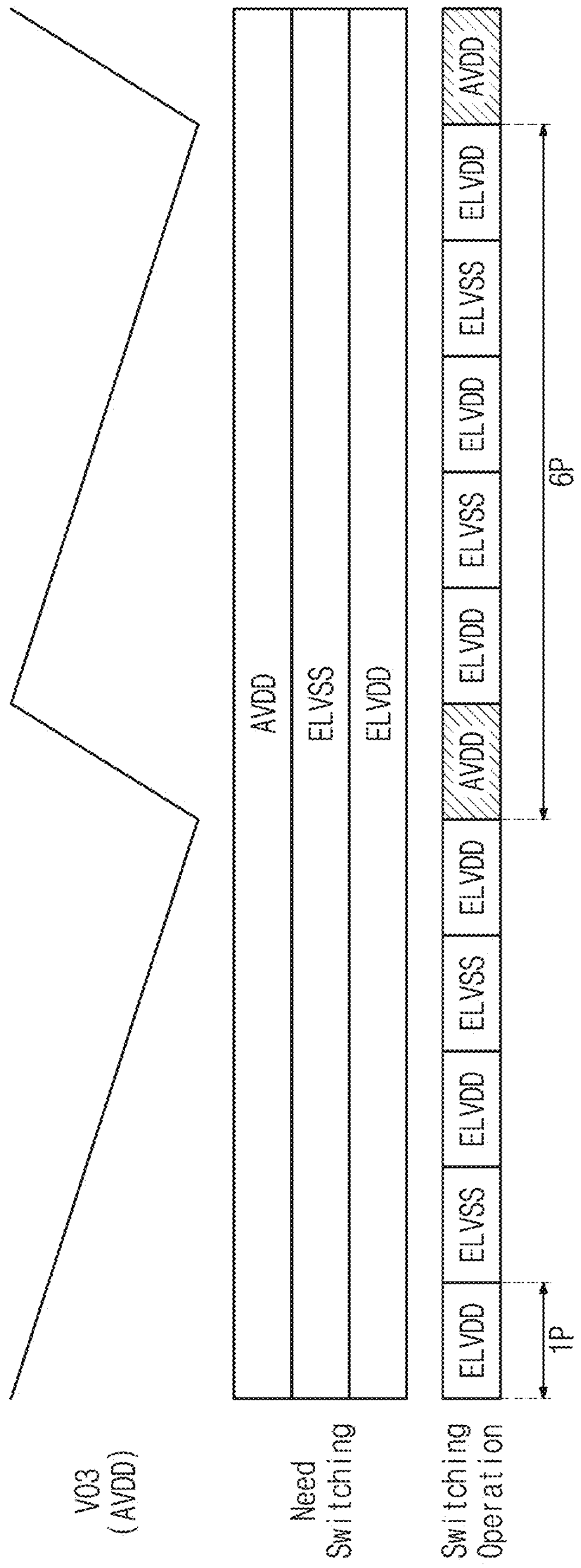
FIGS. 8A and 8B are timing diagrams illustrating operation of FIFO and priority logic and a voltage converter when a priority of a second driving voltage is higher than that of a third driving voltage.
Figure 8B:
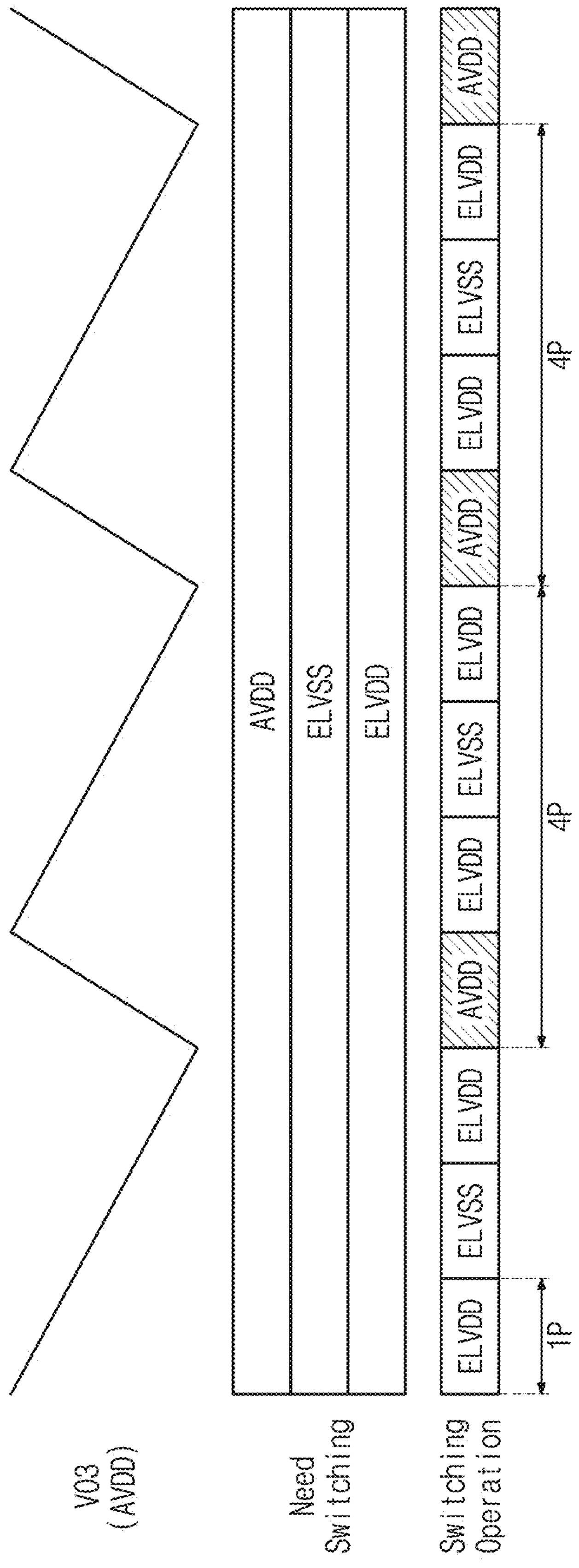

FIGS. 8A and 8B are timing diagrams illustrating example operations of the FIFO and priority logic 320 and the voltage converter 340 when the priority of the second driving voltage ELVSS is higher than the priority of the third driving voltage AVDD.

Referring to FIGS. 2 and 8A, when a switching operation is required to generate all of the first driving voltage ELVDD, the second driving voltage ELVSS, and the third driving voltage AVDD, the FIFO and priority logic 320 may determine the priorities in the order of the first driving voltage ELVDD, the second driving voltage ELVSS, and the third driving voltage AVDD. The priority of the second driving voltage ELVSS is higher than that of the third driving voltage AVDD, so when the generation period of the third driving voltage AVDD increases to 6P, the change range of the third driving voltage AVDD may increase.

Referring to FIGS. 2 and 8B, the FIFO and priority logic 320 may set the priority of the second driving voltage ELVSS to be higher than that of the third driving voltage AVDD and may set the generation period of the third driving voltage AVDD to a maximum of 4P. In an embodiment, when the load of the device receiving the third driving voltage AVDD, for example, the data driving circuit 200 (refer to FIG. 1) is small, the generation period of the third driving voltage AVDD may be changed to a value greater than 4P.

As described herein, a voltage generator with the above-described configuration may adopt a single inductor multiple output (SIMO) structure to generate a plurality of driving voltages. The voltage generator may further operate in the SIMO by increasing the priority of the driving voltage that most affects display quality or that drives the largest load. As a result, the voltage levels of the driving voltages may be maintained stably while minimizing power consumption. Therefore, the display quality of the display device may be guaranteed.

Although example embodiments of the present disclosure have been described for illustrative purposes, those skilled in the art will appreciate that various modifications, and substitutions are possible, without departing from the scope and spirit of the disclosure as disclosed in the accompanying claims. Accordingly, the technical scope of the present disclosure is not limited to the detailed description but should be defined by the claims.

What is claimed is:

1. A voltage generator comprising:

an input circuit configured to output a first request signal and a second request signal in response to first and second voltage data signals and first and second feedback voltages;

a FIFO and priority logic configured to output one of first and second selection signals as an active level in synchronization with a clock signal when at least one of the first and second request signals is at the active level;

switching logic configured to output a plurality of switching signals in response to one of the first and second selection signals, which is the active level; and a voltage converter configured to convert an input voltage into first and second output voltages, respectively, in response to the plurality of switching signals, and to output the first and second feedback voltages corresponding to the first and second output voltages, respectively, and wherein when the first and second request signals are simultaneously at the active level, the FIFO and priority logic outputs one of the first and second selection signals at the active level depending on a priority including a period of the clock signal for each of the first and second selection signals.

2. The voltage generator of claim 1, wherein the input circuit includes:

a first digital-to-analog converter configured to convert the first voltage data signal to a first reference voltage;

a first amplifier configured to compare the first feedback voltage with the first reference voltage and to output the first request signal;

a second digital-to-analog converter configured to convert the second voltage data signal to a second reference voltage; and a second amplifier configured to compare the second feedback voltage with the second reference voltage and to output the second request signal.

3. The voltage generator of claim 2, wherein the first amplifier outputs the first request signal at the active level when a voltage level of the first feedback voltage is lower than or equal to the first reference voltage.

4. The voltage generator of claim 1, wherein the FIFO and priority logic outputs the first selection signal at the active level when the first and second request signals are simultaneously at the active level.

5. The voltage generator of claim 1, wherein, when a period of the clock signal is 'P' and the first and second request signals are simultaneously at the active levels, the FIFO and priority logic outputs the first and second selection signals such that a period of the first selection signal is 2P or less.

6. The voltage generator of claim 1, wherein the input circuit further outputs a third request signal in response to a third data signal and a third feedback voltage, wherein the FIFO and priority logic outputs any one of the first, second, and third selection signals in synchronization with the clock signal at the active level when at least one of the first, second, and third request signals is at the active level, wherein the switching logic outputs the plurality of switching signals in response to one of the first, second, and third selection signals, which is the active level, and wherein the voltage converter converts the input voltage into a third output voltage in response to the plurality of switching signals and further outputs the third feedback voltage corresponding to the third output voltage.

7. The voltage generator of claim 6, wherein the first request signal has a higher priority than the second request signal, and the second request signal has a higher priority than the third request signal.

8. The voltage generator of claim 7, wherein, when a period of the clock signal is 'P' and the first, second, and third request signals are simultaneously at the active level, the FIFO and priority logic outputs the first, second, and third selection signals such that a period of the first selection signal is 2P or less, and a period of each of the second and third selection signals is 4P or less.

9. The voltage generator of claim 1, wherein the first and second voltage data signals are signals corresponding to target voltage levels of each of the first and second output voltages.

10. The voltage generator of claim 1, wherein the voltage converter includes a single inductor multiple output structure.

11. A display device comprising:

a display panel;

a scan driving circuit configured to provide a scan signal to the display panel;

a data driving circuit configured to provide a data signal to the display panel;

a driving controller configured to output first and second voltage data signals and a clock signal; and a voltage generator configured to provide first and second driving voltages to the display panel, and wherein the voltage generator includes:

an input circuit configured to output a first request signal and a second request signal in response to the first and second voltage data signals and first and second feedback voltages;

a FIFO and priority logic configured to output one of first and second selection signals as an active level in synchronization with the clock signal when at least one of the first and second request signals is at the active level;

switching logic configured to output a plurality of switching signals in response to one of the first and second selection signals, which is the active level; and a voltage converter configured to convert an input voltage into first and second driving voltages, respectively, in response to the plurality of switching signals, and to output the first and second feedback voltages corresponding to the first and second driving voltages, respectively, and wherein the FIFO and priority logic outputs one of the first and second selection signals at the active level depending on a priority when the first and second request signals are simultaneously at the active level, wherein the priority includes a period of the clock signal for each of the first and second selection signals.

12. The display device of claim 11, wherein the input circuit includes:

a first digital-to-analog converter configured to convert the first voltage data signal to a first reference voltage;

a first amplifier configured to compare the first feedback voltage with the first reference voltage and to output the first request signal;

a second digital-to-analog converter configured to convert the second voltage data signal to a second reference voltage; and a second amplifier configured to compare the second feedback voltage with the second reference voltage and to output the second request signal.

13. The display device of claim 12, wherein the first amplifier outputs the first request signal at the active level when a voltage level of the first feedback voltage is lower than or equal to the first reference voltage.

14. The display device of claim 11, wherein the FIFO and priority logic outputs the first selection signal at the active level when the first and second request signals are simultaneously at the active level.

15. The display device of claim 11, wherein, when a period of the clock signal is 'P' and the first and second request signals are simultaneously at the active level, the FIFO and priority logic outputs the first and second selection signals such that a period of the first selection signal is 2P or less.

16. The display device of claim 11, wherein the input circuit further outputs a third request signal in response to a third data signal and a third feedback voltage, wherein the FIFO and priority logic outputs any one of the first, second, and third selection signals at the active level in synchronization with the clock signal when at least one of the first, second, and third request signals is at the active level, wherein the switching logic outputs the plurality of switching signals in response to one of the first, second, and third selection signals, which is the active level, and wherein the voltage converter converts the input voltage into a third driving voltage in response to the plurality of switching signals and further outputs the third feedback voltage corresponding to the third driving voltage.

17. The display device of claim 16, wherein the first request signal has a higher priority than the second request signal, and the second request signal has a higher priority than the third request signal.

18. The display device of claim 17, wherein, when a period of the clock signal is 'P' and the first, second, and third request signals are simultaneously at the active level, the FIFO and priority logic outputs the first, second, and third selection signals such that a period of the first selection signal is 2P or less, and a period of each of the second and third selection signals is 4P or less.

19. The display device of claim 11, wherein the voltage converter includes a single inductor multiple output structure.

20. The display device of claim 11, wherein the first and second voltage data signals are signals corresponding to target voltage levels of each of the first and second driving voltages.

* * * * *